United States Patent
Katsuki

(10) Patent No.: US 8,485,763 B2
(45) Date of Patent: Jul. 16, 2013

(54) HELICAL BROACH FOR ROUGHING

(75) Inventor: Yasuhito Katsuki, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 413 days.

(21) Appl. No.: 12/920,126

(22) PCT Filed: Sep. 10, 2009

(86) PCT No.: PCT/JP2009/065856
§ 371 (c)(1),
(2), (4) Date: Sep. 29, 2010

(87) PCT Pub. No.: WO2010/029975
PCT Pub. Date: Mar. 18, 2010

(65) Prior Publication Data
US 2011/0020078 A1 Jan. 27, 2011

(30) Foreign Application Priority Data

Sep. 12, 2008 (JP) ................................. 2008-234286

(51) Int. Cl.
*B23D 43/02* (2006.01)

(52) U.S. Cl.
USPC ............................................ 407/18; 407/19

(58) Field of Classification Search
CPC ............ B23D 43/02; B23D 43/00; B23F 21/26
USPC .................... 407/19, 13, 18, 15, 12; 409/259
IPC ....................... B23D 43/00, 43/02; B23F 21/26
See application file for complete search history.

(56) References Cited

U.S. PATENT DOCUMENTS

| | | | | | |
|---|---|---|---|---|---|
| 2,060,889 A | * | 11/1936 | Nilsson | ........................... | 407/18 |
| 2,140,146 A | * | 12/1938 | Tautz | .............................. | 407/18 |
| 2,390,722 A | * | 12/1945 | Markstrum | ..................... | 407/15 |
| 3,178,800 A | * | 4/1965 | Psenka | ........................... | 407/16 |
| 2003/0103817 A1 | | 6/2003 | Berktold et al. | | |

FOREIGN PATENT DOCUMENTS

| | | |
|---|---|---|
| JP | 60-150907 A | 8/1985 |
| JP | 2003-205421 A | 7/2003 |
| JP | 2005-144639 A | 6/2005 |
| JP | 2007-98523 A | 4/2007 |
| JP | 2007-253297 A | 10/2007 |

OTHER PUBLICATIONS

Korean Office Action mailed Mar. 23, 2012 with English Translation.

* cited by examiner

*Primary Examiner* — Daniel Howell
*Assistant Examiner* — Ryan Rufo
(74) *Attorney, Agent, or Firm* — Birch, Stewart, Kolasch & Birch, LLP

(57) ABSTRACT

A helical broach 1 for roughing includes a cutting tooth part 30 in which n spline teeth 31 are arranged side by side in an axial direction. The spline teeth 31 each include cutting teeth 32 which are arranged at a predetermined helix angle. The cutting teeth 32 each have an acute angle portion and an obtuse angle portion on both sides thereof in a circumferential direction. The cutting teeth disposed on the first to n-1$^{th}$ spline teeth 31 ($S_1$ to $S_{n-1}$) in the circumferential direction are each formed in such a way that its height on the acute angle portion side differs from that on the obtuse angle portion side. The cutting teeth ($S_n$) of the n$^{th}$ spline tooth ($S_n$) are each formed in such a way that its height stays constant in the circumferential direction.

3 Claims, 6 Drawing Sheets

A

B

A

B

C

HELICAL BROACH FOR ROUGHING

BACKGROUND OF THE INVENTION

1. Field of the Invention

The present invention relates to a helical broach for roughing.

2. Description of the Related Art

Heretofore, roughing and finishing using helical broaches have been a mainstream in manufacture of internal gears. Helical broaches each perform cutting on a prepared hole formed in advance in a work piece by use of its cutting teeth which are larger gradually and sequentially in an outer radial direction and in a tooth thickness direction. Various studies have been made on helical broaches. There exist many variations of helical broaches such as: a type which includes a set of several separate units for roughing and finishing; a type in which a roughing cutting tooth group and a finishing cutting tooth group are put together into one unit; as well as an assembly type in which a roughing cutting tooth group and a finishing cutting tooth group are assembled and integrated together.

In machining using these helical broaches, it has been known that a helix angle causes a difference in cutting performance between the left side and the right side (an acute angle portion side and an obtuse angle portion side) of a toothed gear, which may in turn lead to unbalanced cutting in the right and left sides of the toothed gear.

Since the cutting teeth are arranged at the helix angle, the angle between a rake face and one tooth face of a cutting tooth is acute while the angle between the rake face and the other tooth face is obtuse. This angular difference between both sides of the rake face causes the unbalanced cutting in machining using the helical broach and thus is one of the causes hindering improvement of the accuracy of machining using the helical broach. The cutting performance on the acute angle portion side is finer than that on the obtuse angle portion side, particularly in a case of a helical broach of an axially-perpendicular gullet type configured by arranging multiple spline teeth perpendicularly to the axial direction. In other words, since the cutting performance on the obtuse angle portion side is lower than the cutting performance on the acute angle portion side, there occurs a large difference in cutting performance between the tooth faces on both sides of the rake face. This causes a problem of affecting the tooth profile accuracy and the tooth trace accuracy.

To address such problem, Patent Document 1 below discloses a configuration in which a relief angle at an obtuse corner of a cutting tooth is made larger than a relief angle at an acute corner of the cutting tooth to thereby balance the cutting performances of both of the corner portions. The cutting performance is thus balanced between the right and left cutting tooth corner portions of each cutting tooth of spline teeth.

CITATION LIST

Patent Document

Patent Document 1: Japanese Patent Application Publication No. Sho 60-150907

SUMMARY OF INVENTION

Technical Problem

However, with increasing demands for a higher accuracy in recent years, finishing more accurate than broaching has been demanded. While various studies have been made on machining methods as to finishing for internal gears, other than broaching, development of helical broaches allowing machining with a higher accuracy has been requested.

In view of the above circumstances, an object of the present invention is to provide a helical broach for roughing capable of reducing an adverse influence on the tooth profile accuracy and the tooth trace accuracy and therefore improving the machining accuracy.

Solution to Problem

A helical broach for roughing according to a first invention made to address the above problems includes a cutting tooth part in which a plurality of spline teeth are arranged side by side in an axial direction, the spline teeth each including cutting teeth which are arranged at a predetermined helix angle, the cutting teeth each having an acute angle portion and an obtuse angle portion on both sides thereof in a circumferential direction. The helical broach for roughing is characterized in that the cutting teeth disposed on part of the spline teeth in the circumferential direction are each formed in such a way that its height on the acute angle portion side differs from that on the obtuse angle portion side, the part of the spline teeth being spline teeth disposed sequentially from a leading one of the spline teeth, and the cutting teeth of the other part of the spline teeth are each formed in such a way that its height stays constant in the circumferential direction.

The helical broach for roughing according to a second invention is characterized in that, in the helical broach for roughing according to the first invention, part or all of the cutting teeth on circumferences of the part of the spline teeth are each formed in such a way that its height on the acute angle portion side differs from that on the obtuse angle portion side.

The helical broach for roughing according to a third invention is characterized in that, in the helical broach for roughing according to the second invention, the cutting teeth of the part of the spline teeth are each formed in such a way that its cutting edge is smaller in width than those of the cutting teeth of the other part of the spline teeth having a similar shape.

The helical broach for roughing according to a fourth invention is characterized in that, in the helical broach for roughing according to the third invention, the cutting teeth of the part of the spline teeth each have an inclined portion formed on the obtuse angle portion side in such a way that the inclined portion increases in height from the obtuse angle portion side toward the acute angle portion side and that the cutting edge is smaller in width than those of the cutting teeth of the other part of the spline teeth having a similar shape.

Advantageous Effects of Invention

The helical broach for roughing according to the first invention mentioned above is a helical broach for roughing that includes a cutting tooth part in which multiple spline teeth are arranged side by side in an axial direction. The spline teeth each include cutting teeth which are arranged at a predetermined helix angle. The cutting teeth each have an acute angle portion and an obtuse angle portion on both sides thereof in a circumferential direction. The cutting teeth disposed on part of the spline teeth in the circumferential direction are each formed in such a way that its height on the acute angle portion side differs from that on the obtuse angle portion side. The part of the spline teeth are spline teeth disposed sequentially from a leading one of the spline teeth. The cutting teeth of the other part of the spline teeth are each formed in such a way that its height stays constant in the circumferential direction. A prepared hole may be first machined with the part of the spline teeth, which achieves balanced cutting by reducing the difference in cutting performance between the acute angle portion side and the obtuse angle portion side of each cutting tooth. Then, machining may be performed with the other part of the spline teeth to obtain a final shape. This reduces an adverse influence on the tooth profile accuracy and the tooth trace accuracy attributable to the difference in cutting performance, thereby allowing improvement in the machining accuracy.

Also, in the helical broach for roughing according to the second invention mentioned above, part or all of the cutting teeth on circumferences of the part of the spline teeth are each formed in such a way that its height on the acute angle portion side differs from that on the obtuse angle portion side. Hence, unbalanced cutting by the acute angle portion side and the obtuse angle portion side of each cutting tooth is alleviated. This reduces an adverse influence on the tooth profile accuracy and the tooth trace accuracy, allowing improvement in the machining accuracy.

Also, in the helical broach for roughing according to the third invention mentioned above, the cutting teeth of the part of the spline teeth are each formed in such a way that its cutting edge is smaller in width than those of the cutting teeth of the other part of the spline teeth having a similar shape. A general helical broach of an axially-perpendicular gullet type may be subjected to machining so that the width of the cutting edge may be made smaller for each cutting tooth of the part of the spline teeth disposed sequentially from the leading spline tooth. In this way, the machining accuracy of this helical broach can be improved.

Also, in the helical broach for roughing according to the fourth invention mentioned above, the cutting teeth of the part of the spline teeth each have an inclined portion formed on the obtuse angle portion side in such a way that the inclined portion increases in height from the obtuse angle portion side toward the acute angle portion side and that the cutting edge is smaller in width than those of the cutting teeth of the other part of the spline teeth having the similar shape. A general helical broach of an axially-perpendicular gullet type may be subjected to machining so that the inclined portion may be provided to the tooth face on the obtuse angle portion side at a position radially outward for each of the cutting teeth of the part of the spline teeth disposed sequentially from the leading spline tooth. In this way, the machining accuracy can be improved.

DETAILED DESCRIPTION ON THE INVENTION

Modes for carrying out the present invention will be described in detail on the basis of the following embodiments.

EXAMPLES

An embodiment of the present invention will be described using FIGS. 1 to 5.

Figure 1:
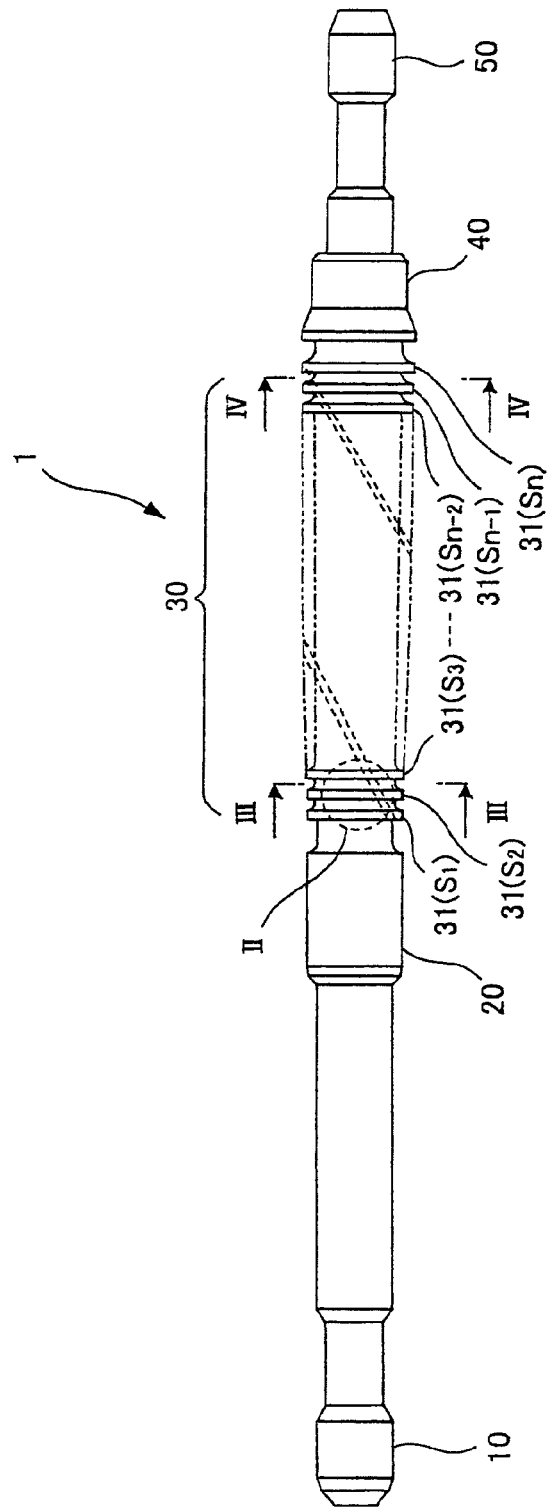
FIG. 1 is an overall view of a helical broach for roughing according to an embodiment of the present invention.

As shown in FIG. 1, a helical broach 1 for roughing in the embodiment has a configuration integrally formed, mainly, of a pull end 10, a front pilot 20, a cutting tooth part 30 where many spline teeth 31 ($S_1$ to $S_n$) are arranged, a rear pilot 40, and a follower end 50.

The pull end 10 is a part provided to attach the helical broach 1 for roughing to a pull head of a broaching machine. The front pilot 20 is a part to guide a prepared hole formed in advance in a work piece 2 (see FIG. 5) to the first spline tooth 31 ($S_1$), i.e., the leading tooth of the helical broach 1 for roughing.

Figure 2:
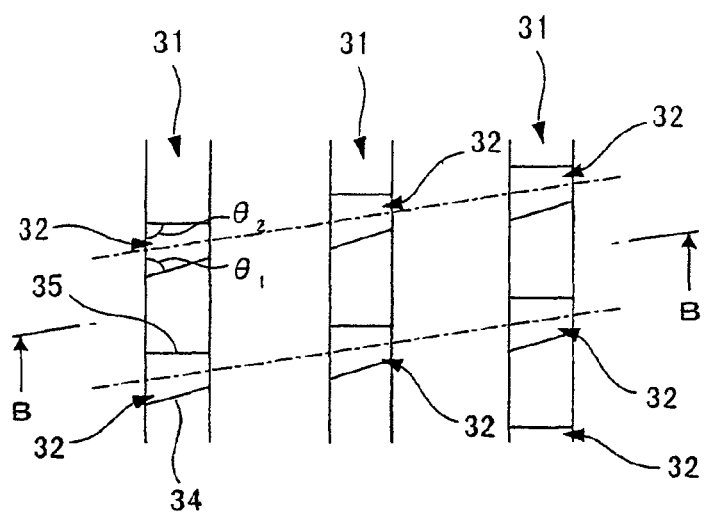
FIG. 2A is an enlarged view of an area II in FIG. 1.
FIG. 2B is a cross-sectional view taken along the arrow B-B of FIG. 2A.
Figure 2:
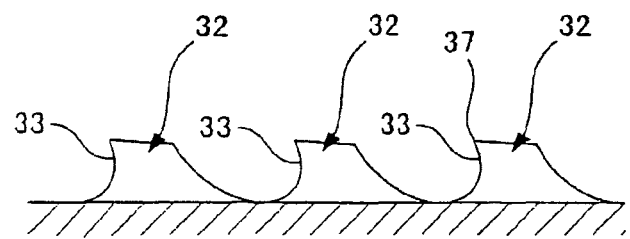
Figure 3:
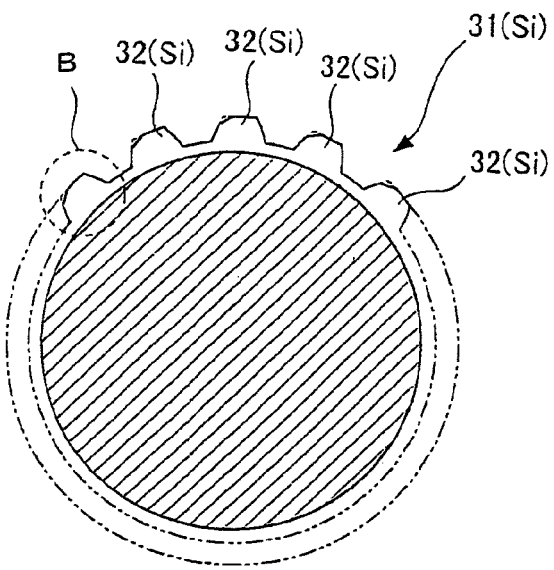
FIG. 3A is a cross-sectional view taken along the arrow III-III of FIG. 1.
FIG. 3B is an enlarged view of an area B in FIG. 3A.
FIG. 3C is a perspective view of FIG. 3B.
Figure 3:
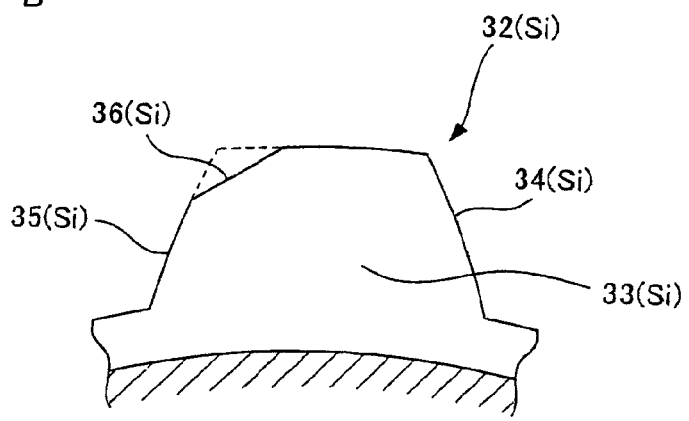
Figure 3:
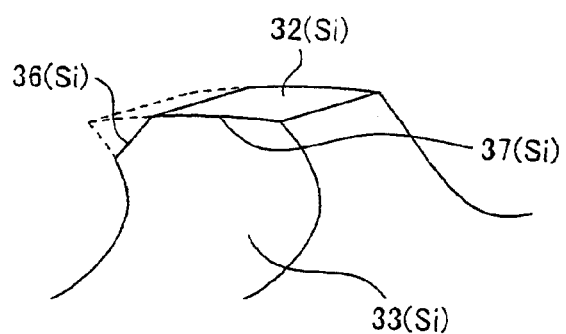
Figure 4:
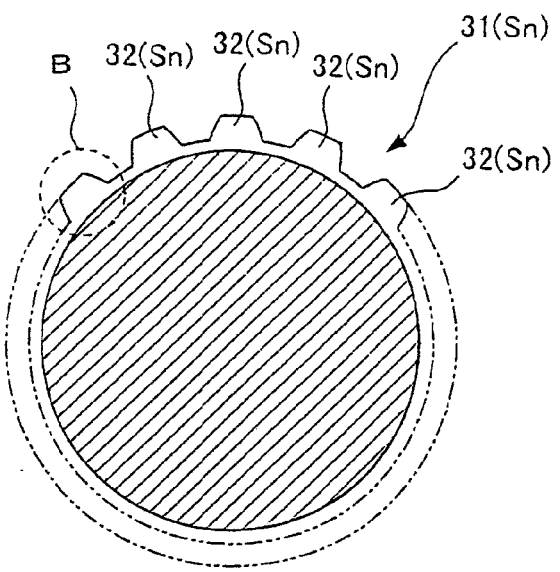
FIG. 4A a cross-sectional view taken along the arrow IV-IV of FIG. 1.
FIG. 4B is an enlarged view of an area B in FIG. 4A.
FIG. 4C is a perspective view of FIG. 4B.
Figure 4:
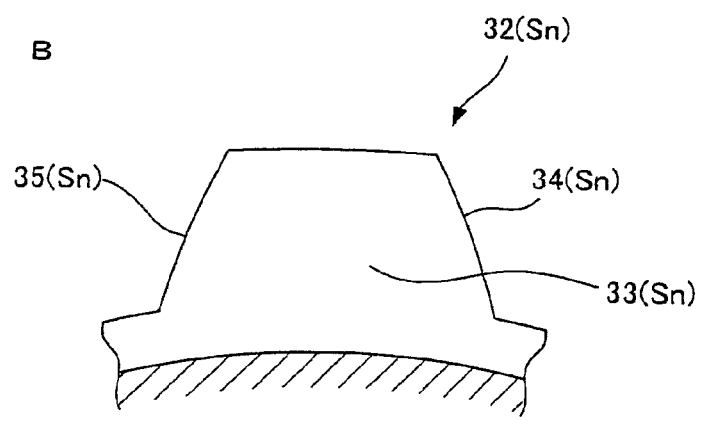
Figure 4:
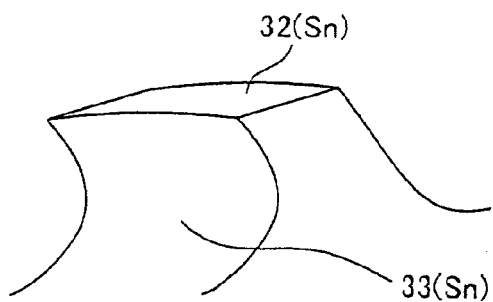

The cutting tooth part 30 is configured such that the many (n teeth in the embodiment) spline teeth 31 are arranged side by side in the axial direction. As shown in FIGS. 2 to 4, these spline teeth 31 each include a predetermined number of cutting teeth 32. The spline teeth 31 are arranged in the ascending order of their sizes so that the height of the cutting tooth 32 is larger toward a rear side.

In addition, as shown in FIG. 2, in the spline teeth 31, the cutting teeth 32 are arranged at a predetermined helix angle. Moreover, angles which a rake face 33, which is a front face of each cutting tooth 32, forms with tooth faces 34 and 35, which are faces located on both lateral sides of the rake face 33, are an acute angle $O_1$ and an obtuse angle $O_2$, respectively. The cutting tooth 32 therefore has an acute angle portion (the tooth face 34 side) and an obtuse angle portion (the tooth face 35 side).

Further, in the embodiment, among the spline teeth 31, n−1 of the spline teeth 31 including the first to n−$1^{th}$ spline teeth 31 ($S_1$ to $S_{n-1}$) differ from the n$^{th}$ spline tooth 31 ($S_n$) in that the cutting teeth 32 ($S_1$ to $S_{n-}$) have different shape from the cutting teeth 32 ($S_n$).

To be specific, each of the cutting teeth 32 ($S_1$ to $S_{n-1}$) of the first n−$1^{th}$ spline teeth 31 ($S_1$ to $S_{n-1}$) has a substantially trapezoidal shape in front view as shown in FIG. 3. Moreover, an inclined portion 36 ($S_1$ to $S_{n-1}$) is provided to each tooth face 35 ($S_1$ to $S_{n-1}$) on the obtuse angle portion side by chamfering a cutting edge 37 ($S_1$ to $S_{n-1}$) side thereof in the axial direction so that the tooth height on the acute angle portion side may differ from that on the obtuse angle portion side. Note "$S_1$ to $S_{n-1}$" is indicated as "$S_i$" in FIG. 3. The same applies to FIGS. 6 and 7 to be described later.

In other words, each cutting tooth 32 ($S_1$ to $S_{n-1}$) is formed in such a shape that its tooth height on the obtuse angle portion side increases gradually from the obtuse angle portion side toward the acute angle portion side. The width of each cutting edge 37 ($S_1$ to $S_{n-1}$) is therefore smaller than those of the cutting teeth 32 ($S_n$) of the n$^{th}$ spline tooth 31 ($S_n$) shown in FIG. 4 which have a similar shape.

In contrast, each cutting tooth 32 ($S_n$) of the n$^{th}$ spline tooth 31 ($S_n$) has a substantially trapezoidal shape in front view as shown in FIG. 4. The acute angle portion and the obtuse angle portion are formed symmetrically to each other in front view so that the tooth height may remain constant in the circumferential direction. Each cutting tooth 32 ($S_n$) of the n$^{th}$ spline tooth 31 ($S_n$) is set to such a size that corresponds to the finish size of an internal gear to be formed in the prepared hole of the work piece.

The rear pilot 40 is a part to hold the work piece while staying inside the prepared hole of the work piece after the end of machining. The follower end 50 is a part to attach the helical broach 1 for roughing to a retrieving head of the broaching machine.

Figure 5:
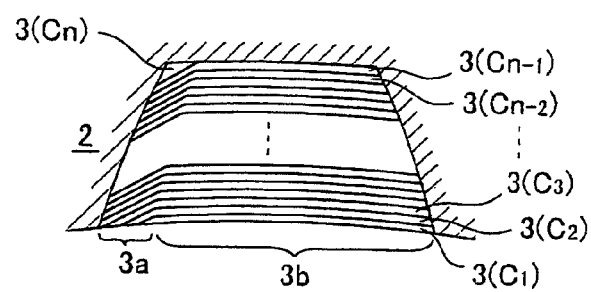
FIG. 5 is an explanatory view showing how cutting is performed by the helical broach for roughing according to the embodiment.

The prepared hole of the work piece is machined into an internal gear as follows by using the helical broach 1 for roughing according to the embodiment. The pull end 10 of the helical broach 1 for roughing is let through the prepared hole of the work piece. Then, the helical broach 1 for roughing is twisted and pulled out frontward. Thereby, the prepared hole of the work piece is machined into an internal gear. Specifically, the spline teeth 31, disposed in the cutting tooth part in the ascending order of their sizes, cut sequentially cutting portions 3 ($C_1$ to $C_n$) of the work piece 2 as shown in FIG. 5 to thereby form an internal gear in the prepared hole of the work piece 2.

Here, in the helical broach 1 for roughing of the embodiment, each of the cutting teeth 32 ($S_1$ to $S_{n-1}$) of the first to n−1$^{th}$ spline teeth 31 ($S_1$ to $S_{n-1}$) has the inclined face 36 ($S_1$ to $S_{n-1}$) on its obtuse angle portion side as mentioned above. Therefore, the cutting portions 3 ($C_1$ to $C_{n-1}$) sequentially machined by the spline teeth 31 ($S_1$ to $S_{n-1}$) have shallow grooves in a region 3a corresponding to the inclined faces 36 ($S_1$ to $S_{n-1}$) of the cutting teeth 32 ($S_1$ to $S_{n-1}$), compared to those in the other region 3b.

In contrast, the acute angle portion side and the obtuse angle portion side of the n$^{th}$ spline tooth 31 ($S_n$) form a symmetrical shape in front view. Hence, after the machining with the first to n−1$^{th}$ spline teeth 31 ($S_1$ to $S_{n-1}$), the cutting portion 3 ($C_1$) is cut lastly with the n$^{th}$ spline tooth 31 ($S_n$) so that a final, finish size is obtained.

In the embodiment mentioned above, the configuration is such that the inclined portions 36 ($S_1$ to $S_{n-1}$) are provided so that the tooth height of each cutting tooth 32 ($S_1$ to $S_{n-1}$) of the spline teeth 31 ($S_1$ to $S_{n-1}$) of the first to n−1$^{th}$ spline teeth 31 ($S_1$ to $S_{n-1}$) of the helical broach 1 for roughing may become different between the acute angle portion side and the obtuse angle portion side. This configuration is made to minimize a lower-cutting-performance region, which is a region on the obtuse angle portion side of each cutting tooth 32 ($S_1$ to $S_{n-1}$) of the spline teeth 31 ($S_1$ to $S_{n-1}$), where the cutting performance is lower than that on the acute angle portion side. This leads to reduction of the difference in cutting performance between the acute angle portion side and the obtuse angle portion side.

Thereby, according to the embodiment, the difference in cutting performance between the acute angle portion side and the obtuse angle portion side is reduced by minimizing the lower-cutting-performance region on the obtuse angle portion side of each cutting tooth 32 ($S_1$ to $S_{n-1}$) of the spline teeth 31 ($S_1$ to $S_{n-1}$). This alleviates unbalanced cutting in the acute angle portion side and the obtuse angle portion side. Thereby, an adverse influence on the tooth profile accuracy and the tooth trace accuracy is reduced, allowing improvement in the machining accuracy.

Note that the above-mentioned embodiment has shown an example where the inclined portions 36 ($S_1$ to $S_{n-1}$) are provided to the obtuse angle portion side of the cutting teeth 32 ($S_1$ to $S_{n-1}$) of the first to n−1$^{th}$ spline teeth 31 ($S_1$ to $S_{n-1}$); however, the present invention is not limited to such embodiment. For example, the chamfered shape may be given to the obtuse angle portion side of each cutting tooth 32 ($S_1$ to $S_m$) of the first to m$^{th}$ spline teeth 31 ($S_1$ to $S_m$) (where 1<m<n−1).

Then, each cutting tooth of the m+1$^{th}$ to n$^{th}$ spline teeth 31 ($S_{m+1}$ to $S_n$) may be formed in such a way that the acute angle portion side and the obtuse angle portion side of the cutting tooth form the symmetrical shape.

In addition, the above-mentioned embodiment has described an example where the inclined portions 36 ($S_1$ to $S_{n-1}$) are provided to the obtuse angle portion sides of all the cutting teeth 32 ($S_1$ to $S_{n-1}$) on the circumferences of the spline teeth 31 ($S_1$ to $S_{n-1}$); however, the present invention is not limited to such embodiment. The inclined portion 36 ($S_1$ to $S_{n-1}$) may be provided only on the obtuse angle portion side of part of the cutting teeth 32 ($S_1$ to $S_{n-1}$) on the circumferences of the spline teeth 31 ($S_1$ to $S_{n-1}$). Even this alleviates unbalanced cutting in the acute angle portion side and the obtuse angle portion side. Thereby, an adverse influence on the tooth profile accuracy and the tooth trace accuracy is reduced, allowing improvement in the machining accuracy.

Figure 6:
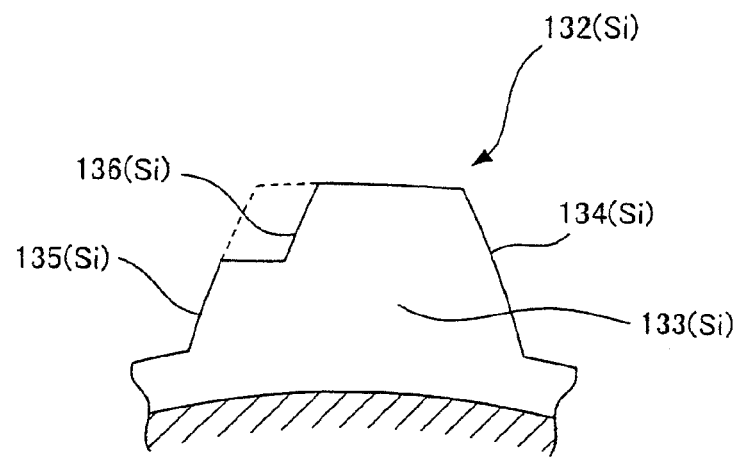
FIG. 6 is a plan view showing another example of each cutting tooth of a spline tooth according to the embodiment.
Figure 7:
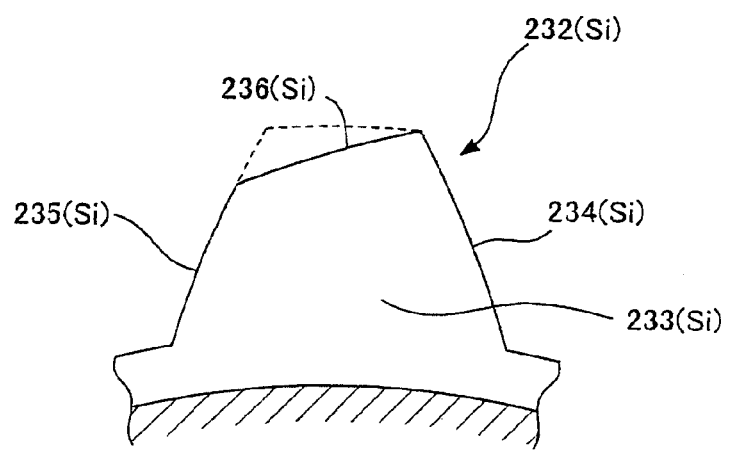
FIG. 7 is a plan view showing still another example of each cutting tooth of the spline tooth according to the embodiment.

Moreover, the following measure may be taken instead of providing the inclined portions 36 ($S_1$ to $S_{n-1}$) on the obtuse angle portion sides of some or all of the cutting teeth 32 ($S_1$ to $S_{n-1}$) of the spline teeth 31 ($S_1$ to $S_{n-1}$). Specifically, stepped portions 136 ($S_1$ to $S_{n-1}$) may be provided to tooth faces 135 ($S_1$ to $S_{n-1}$) of cutting teeth 132 ($S_1$ to $S_{n-1}$) on the obtuse angle portion side at a position radially outward as shown in FIG. 6, or tapers 236 ($S_1$ to $S_{n-1}$) may be provided to machining allowances of cutting teeth 232 ($S_1$ to $S_{n-1}$) as shown in FIG. 7. Any such measure may be taken as long as it makes the tooth height of each cutting tooth of the part of the spline teeth different between the acute angle portion side and the obtuse angle portion side. It is needless to say that various modifications can be made without departing from the scope of the present invention.

Also, the present invention is not limited only to helical broaches for roughing. The tooth height of each cutting tooth of the part of spline teeth only has to be made different between the acute angle portion side and the obtuse angle portion side by providing, for example, the inclined portion on the obtuse angle portion side of a rough cutting tooth group of a helical broach of a roughing-finishing integrated type or of an assembly type. Needless to say, the present invention can also improve the machining accuracy in these ways.

INDUSTRIAL APPLICABILITY

The present invention is suitably applied to rough cutting tooth groups of helical broaches for roughing, of helical broaches of a roughing-finishing integrated type and of an assembly type, and the like.

REFERENCE SIGNS LIST

1 Helical Broach for Roughing
2 Work Piece
3 Cutting Portion
10 Pull End
20 Front Pilot
30 Cutting Tooth Part
31 Spline Tooth
32, 132, 232 Cutting Tooth
33, 133, 233 Rake Face
34, 134, 234 Tooth Face (Acute Angle Portion Side)
35, 135, 235 Tooth Face (Obtuse Angle Portion Side)
36 Inclined Portion
37 Tooth Tip
40 Rear Pilot
50 Follower End
136 Stepped Portion
236 Taper

The invention claimed is:

1. A helical broach for roughing comprising
a cutting tooth part in which a plurality of spline teeth are arranged side by side in an axial direction, the spline teeth each including cutting teeth which are arranged at a predetermined helix angle, the cutting teeth each having an acute angle portion and an obtuse angle portion on both sides of a cutting edge thereof in a circumferential direction for cutting a work piece, wherein
on an obtuse angle portion side of the cutting edge of each of the cutting teeth disposed in the circumferential direction on part of the spline teeth, an inclined portion or a tapered portion for cutting the work piece is formed by gradually increasing a height of the cutting tooth from the obtuse angle portion side toward the acute angle portion side so that the height of the cutting tooth on an acute angle portion side differs from that on the obtuse angle portion side, the part of the spline teeth being spline teeth disposed sequentially from a leading one of the spline teeth, and
the cutting teeth of the other part of the spline teeth are each formed in such a way that its height stays constant in the circumferential direction.

2. The helical broach for roughing according to claim 1, wherein the inclined portion or the tapered portion is formed in the cutting edge of part or all of the cutting teeth on circumferences of the part of the spline teeth.

3. The helical broach for roughing according to claim 2, wherein the cutting teeth of the part of the spline teeth are each formed in such a way that its cutting edge is smaller in width than those of the cutting teeth of the other part of the spline teeth.

* * * * *